(12) United States Patent
Dimitrov et al.

(10) Patent No.: US 6,700,752 B2
(45) Date of Patent: Mar. 2, 2004

(54) NON-MAGNETIC METALLIC LAYER IN A READER GAP OF A DISC DRIVE

(75) Inventors: Dimitar Dimitrov, Edina, MN (US); Michael C. Kautzky, Eagan, MN (US); Sunita B. Gangopadhyay, Chanhasen, MN (US); Jumna P. Ramdular, deceased, late of Brooklyn Park, MN (US), by Ruperta Ramdular, legal representative; Sisavath M. Bounnakhom, Savage, MN (US); I-Fei Tsu, Bloomington, MN (US); Robert W. Lamberton, Londonderry (GB)

(73) Assignee: Seagate Technology LLC, Scotts Valley, CA (US)

( * ) Notice: Subject to any disclaimer, the term of this patent is extended or adjusted under 35 U.S.C. 154(b) by 41 days.

(21) Appl. No.: 10/107,990

(22) Filed: Mar. 27, 2002

(65) Prior Publication Data

US 2002/0154451 A1 Oct. 24, 2002

Related U.S. Application Data

(60) Provisional application No. 60/284,624, filed on Apr. 18, 2001.

(51) Int. Cl.$^7$ .................................................. G11B 5/33
(52) U.S. Cl. ....................................... 360/317; 360/126
(58) Field of Search ................................ 360/317, 320, 360/319, 123, 126, 318, 125; 29/603.13, 603.14, 603.2; 228/215

(56) References Cited

U.S. PATENT DOCUMENTS

| | | | |
|---|---|---|---|
| 5,739,990 A | 4/1998 | Ravipati et al. | 360/113 |
| 5,883,764 A | 3/1999 | Pinarbasi | 360/113 |
| 5,898,548 A * | 4/1999 | Dill et al. | 360/319 |
| 5,958,612 A | 9/1999 | Saito et al. | 428/692 |
| 6,018,862 A | 2/2000 | Stageberg et al. | 29/603.14 |
| 6,195,232 B1 * | 2/2001 | Cohen | 360/123 |
| 6,198,608 B1 * | 3/2001 | Hong et al. | 360/320 |
| 6,212,047 B1 | 4/2001 | Payne et al. | 360/318.1 |
| 6,375,063 B1 * | 4/2002 | Basra et al. | 228/215 |
| 6,396,670 B1 * | 5/2002 | Murdock | 360/319 |
| 6,400,537 B2 * | 6/2002 | Sakakima et al. | 360/319 |
| 6,404,603 B1 * | 6/2002 | Inoue et al. | 360/320 |

* cited by examiner

*Primary Examiner*—Tianjie Chen
(74) *Attorney, Agent, or Firm*—Westman, Champlin & Kelly (57) ABSTRACT

A read/write head with a bottom shield on a slider substrate and a shared shield spaced apart from the bottom shield. A write head is deposited on the shared shield. A read sensor is spaced apart by reader magnetic gaps from the bottom shield and the shared shield. Electrically insulating layers in the reader magnetic gaps form a thermal resistance between the read sensor and the shields. A thermally conducting nonmagnetic layer in a reader magnetic gap reduces the thermal resistance without a corresponding reduction in the reader magnetic gaps.

9 Claims, 8 Drawing Sheets

NON-MAGNETIC METALLIC LAYER IN A READER GAP OF A DISC DRIVE

CROSS-REFERENCE TO RELATED APPLICATION

This application claims priority benefits from U.S. Provisional Application 60/284,624 titled "Increasing The Read-Back Amplitude In Magnetic Recording Heads by Adding A Nonmagnetic Metallic Layer In The Reader Gap," filed Apr. 18, 2001.

FIELD OF THE INVENTION

The present invention relates generally to heads for use in a magnetic storage drive. In particular, this invention relates to methods and structures for reader gaps.

BACKGROUND OF THE INVENTION

A read/write head in a disc drive typically includes a magnetoresistive (MR) read sensor that is deposited between insulating layers and magnetic shield layers. The magnetoresistive read sensor typically includes a magnetoresistor stack, electrical contacts and one or more bias magnets that magnetically bias the magnetoresistor stack.

The magnetoresistor and electrical contacts carry an electrical bias current. As magnetically stored data on a disc flies by the magnetoresistor, the magnetoresistor generates readback pulses that have a readback amplitude that represents the data stored on the disc. The readback amplitude is generally proportional to the bias current. The bias current amplitude and read sensor dimensions are chosen in a way that considers the needs of the read channel electronics for a high amplitude readback pulse. The bias current amplitude and read sensor dimensions are also chosen in a way that considers the need to limit heating to prevent damage to the magnetoresistor. The need for a high amplitude readback pulse and the need to limit heating conflict with one another and limit the performance that can be achieved with conventional magnetoresistive read sensors.

As track density on the disc increases, the reader dimensions must be made correspondingly smaller and the conflict between thermal and electrical design requirements increases beyond the capabilities of current designs.

A magnetic read sensor and a method of making such a magnetic read sensor are needed that provide an improved combination of thermal and electrical characteristics in a read/write head usable with higher areal densities.

SUMMARY OF THE INVENTION

Disclosed is a read/write head that comprises a slider substrate and a read shield. The read shield includes a bottom magnetic shield layer on the slider substrate and a shared magnetic shield layer that is spaced apart from the bottom magnetic shield layer.

The read/write head comprises a write head disposed on the shared magnetic shield layer. The read/write head also comprises a read sensor disposed between the bottom magnetic shield layer and the shared magnetic shield layer. The read sensor is spaced apart from the read shield by reader magnetic gaps.

The read/write head also comprises electrically insulating layers on the read sensor. The electrically insulating layers form a thermal resistance between the read sensor and the read shield.

The read/write head also comprises a thermally conducting nonmagnetic layer deposited on the read shield in a first one of the reader magnetic gaps. The thermally conducting nonmagnetic layer reduces the thermal resistance without a corresponding reduction in the reader magnetic gaps.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below in connection with FIGS. 3–11, a read/write head provides an improved combination of thermal and electrical characteristics. One or more thermally conducting nonmagnetic layers are included in reader gaps around a magnetoresistive read sensor. These thermally conducting nonmagnetic layers reduce thermal resistance without a corresponding reduction in the reader magnetic gaps. Higher levels of bias current can be applied to the magnetoresistive sensor without overheating the magnetoresistor. The needed level of readback amplitude is achieved without overheating.

Figure 1:
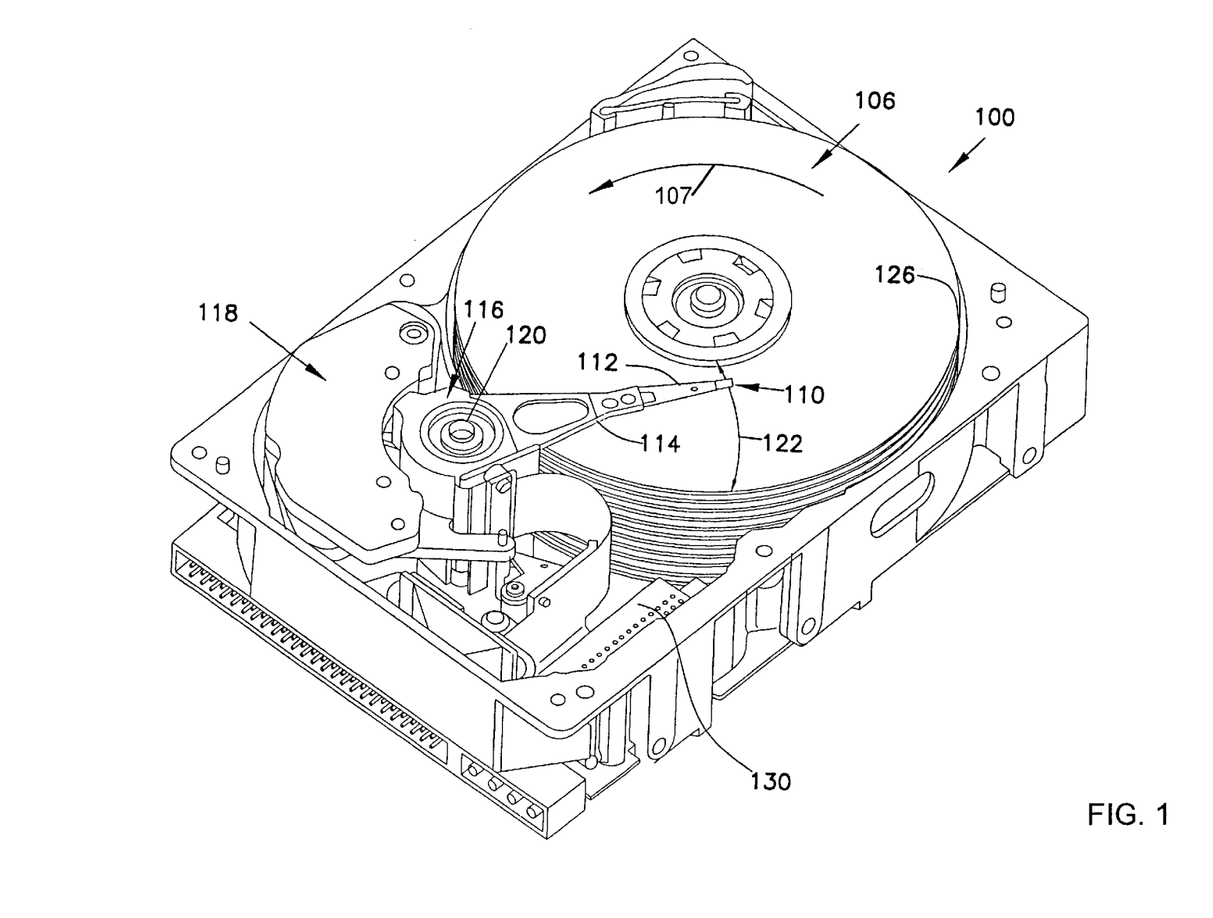
FIG. 1 illustrates a disc drive storage device.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 that includes a read/write head 110, also called a slider. A spindle motor 127 drives rotation of the discs in disc pack 126 in a direction such as that shown by arrow 107. As discs are rotated, read/write assembly 112 accesses different rotational locations on the storage surfaces 106 in disc pack 126. Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system that includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100.

Figure 2:
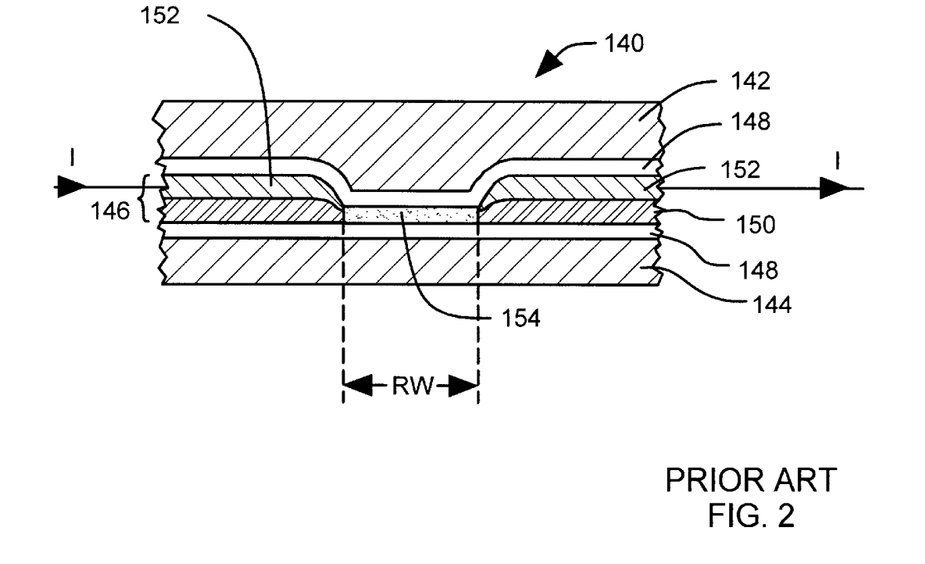
FIG. 2 illustrates a PRIOR ART arrangement of a magnetoresistive read sensor between shield layers.

FIG. 2 illustrates a PRIOR ART arrangement 140 of a read sensor 146. The illustration in FIG. 2 is a cross-sectional view that faces an air bearing surface flying over a disc such as disc surface 106 in FIG. 1. The magnetoresistive read sensor 146 includes a magnetoresistor 154 that abuts permanent magnet layers 150 and electrical contacts 152. The magnetoresistor 154 has a read width RW as indicated in FIG. 2. Magnetic shield layers 142, 144 are separated from the magnetoresistor 154 by insulating layers 148 that form reader gaps. A non-planar shape of the magnetic shield layer 142 is the result of process and design constraints. A bias current I passes through electrical contacts 152 and magnetoresistor 154. A portion of heat dissipated in the magnetoresistor 154 is conducted out of the magnetoresistor 154 through insulating layers 148 to the shield layers 142, 144.

When there is a desire to adapt the prior art arrangement 140 to operate at higher areal bit densities, the overall size of the arrangement 140 is reduced to scale the arrangement to work with the higher areal bit density. It is then apparent that the bias current I needs to be reduced in order to avoid overheating the magnetoresistor 154. After the bias current I is reduced, it is found that the amplitude of the readback pulse is proportionally reduced. In an effort to increase readback pulse amplitude, the thickness of the insulating layers 148 are reduced to reduce thermal resistance between the magnetoresistor 154 and the shields 142, 144, which act as heat sinks. With this reduced thermal resistance, the bias current I can be returned to its original level without causing overheating of the magnetoresistor 154. However, it is then found that the amplitude of the readback pulse is not increased as expected because the shields 142, 144 are now too close to the magnetoresistor 154 and are excessively shielding the magnetoresistor 154 from magnetic transitions on the disc flying under the magnetoresistor 154. In addition, it is found that the reduced thickness of the insulating layers 148 has an undesirably high rate of electrical breakdown due to operating voltage differences between the magnetoresistive sensor 146 and the shields 142, 144. One of the major modes for electrical breakdown is interlayer diffusion which is thermally driven. Efforts to reduce the size of the arrangement 140 thus reach a limit beyond which it is not practical to make further reductions in size by adjusting the level of the current I and the dimensions of various layers in arrangement 140. Reader stacks can be redesigned to have higher magnetoresistive ratios, however, this type of reader redesign reaches a limit also. The operating voltage limit of the materials used in insulating layers 148 and the operating temperature limit of the materials used in various layers of magnetoresistor 154 set practical physical limits for areal density performance of the design illustrated in FIG. 2.

In particular, these physical limits are encountered in an effort to provide an arrangement which have areal densities approaching 50 Gb/inch$^2$, 60 k tracks per inch or 700 kb/inch tracks. In terms of the size of the reader arrangement, these physical limits are encountered with shield-to-shield spacing of about 70 nanometers, reader widths of about 220 nanometers or stripe height of about 150 nanometers.

These physical limits are overcome, however, by arrangements explained below in connection with FIGS. 3–11 that include one or more thermally conducting nonmagnetic layers in the reader gaps. These thermally conducting nonmagnetic layers reduce thermal resistance without a corresponding reduction in the reader magnetic gaps. Higher levels of bias current can be applied to the magnetoresistive sensor without overheating the magnetoresistor. The needed level of readback amplitude is achieved without overheating. Moreover, if problems are encountered with voltage breakdown of a reduced insulating layer, this voltage breakdown problem can be reduced by using atomic layer deposition material in the insulating layer.

Figure 3:
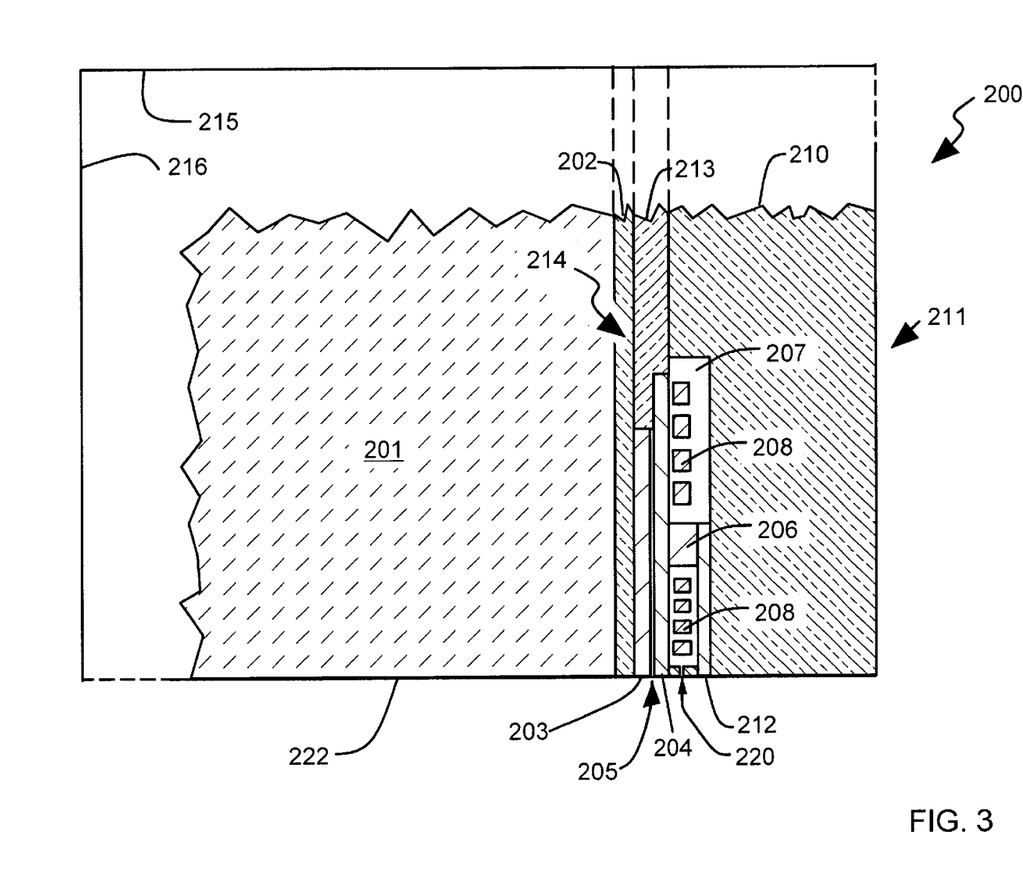
FIG. 3 illustrates a cross sectional side view of a thin film read/write head.

FIG. 3 schematically illustrates a partial cross-section of a read/write head 200 for a disc drive. The read/write head 200 includes a thin film read/write head or transducer 214. The transducer 214 is deposited on a substrate 201. A large part of the read/write head 200 is built from a substrate 201 that extends to edges 215 and 216 as illustrated. The portion of read/write head 200 that is illustrated in cross-section in FIG. 3 is near the trailing edge of the read/write head 200 along a central plane perpendicular to an air bearing surface 222 of the read/write head 200.

The substrate 201 is preferably formed from an electrically conducting ceramic material, such as a mixture of aluminum oxide ($Al_2O_3$) and titanium carbide (TiC), sometimes referred as "AlTiC". Silicon and other known substrate materials can also be used.

A basecoat material 202 is deposited on the top of substrate 201. The basecoat material 202 is an electrically insulating material, typically $Al_2O_3$. The basecoat material 202 forms a bond to the substrate material 201. Silicon dioxide and other known basecoat materials can also be used.

Deposited metallic magnetic layers from alloys of iron (Fe), nickel (Ni), or cobalt (Co) form a bottom magnetic shield layer 203, shared magnetic shield layer 204, top pole 212 and a core 206. Core 206 completes a write magnetic circuit through the center of a coil 208 and through a write gap 220 at the air bearing surface 222. The core 206, the coil 208, the write gap 220 and the coil insulator 207 form a write head 211 disposed on the shared magnetic shield layer 204. The bottom magnetic shield layer 203 is bonded on the substrate 201 by way of the basecoat material 202.

The write coil 208 in the transducer 214 is preferably made from copper or from another highly electrically conducting metal or alloy. A coil insulator 207 is typically formed from a cured photoresist. Silicon dioxide and other known coil insulators can also be used.

An additional deposited electrically insulating layer 213 fills the space around bottom magnetic shield layer 203, and shared magnetic shield layer 204. A portion of layer 213 (not illustrated in FIG. 3) also extends between the bottom magnetic shield layer 203 and the shared magnetic shield layer 204 to provide nonmagnetic, electrically insulating layers around a magnetoresistive read sensor 205. Layer 213 is typically made from $Al_2O_3$ and forms a bond to the basecoat layer 202. One or more thermally conductive nonmagnetic metallic layer (shown, for example, in enlarged FIGS. 6–8) are also arranged around the magnetoresistive read sensor 205.

For clarity, electrical leads and contacts, formed from Cu, Au, or other metals or metallic alloys in a conventional manner are not illustrated in FIG. 3.

One or more insulating overcoat or topcoat layers 210 are deposited on the top of all the transducer 214. Overcoat layer 210 is typically also made from $Al_2O_3$ or other known dielectrics. Overcoat layer 210 is preferably planarized after deposition to expose electrical contacts (not illustrated) for the coil 207 and the magnetoresistive read sensor 205 in the transducer 214.

After the read/write head 200 is formed as illustrated in FIG. 3, it is lapped to precisely shape the air bearing surface (ABS) 222 that flies over the magnetic media.

The read sensor 205 is formed in a very thin layer between the bottom magnetic shield layer 203 and shared magnetic shield layer 204. Read sensor 205 includes a magnetoresistive (MR) or giant magnetoresistive (GMR) sensor, and comprises multiple layers. The read sensor 205 is arranged with one or more thermally conducting nonmagnetic layers as described below in connection with FIGS. 4–11.

Figure 4:
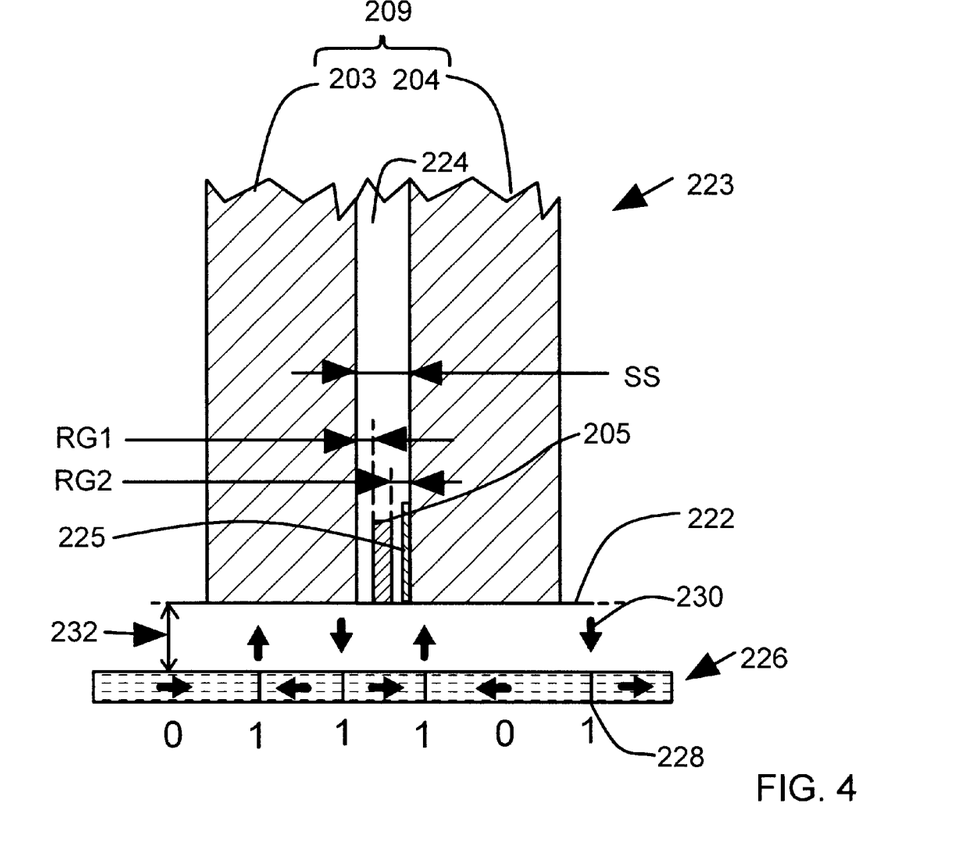
FIG. 4 illustrates an enlarged cross sectional side view of a read sensor along with a magnetic layer of a disc.

FIG. 4 schematically illustrates an enlarged partial cross sectional view of a read head 223 as illustrated in FIG. 3, and flying above a magnetic layer 226 of a disc such as discs 126 illustrated in FIG. 1. In the read head 223, a bottom magnetic shield layer 203 and a shared magnetic shield layer 204 are placed on each side of the read sensor 205 and provide magnetic shielding for the read sensor 205. An insulating layer 224 electrically and magnetically isolates the read sensor 205 from the magnetic shields 203, 204 with magnetic reader gaps RG1, RG2. The magnetic reader gaps RG1, RG2 and the thickness of the read sensor 205 make up a shield spacing SS. Magnetic reader gap RG2 also includes a thermally conductive nonmagnetic layer 225 that is deposited on the shared magnetic shield layer 204. The thermally conductive nonmagnetic layer 225 occupies part of the read gap RG2 with a material that is nonmagnetic, such that the full magnetic reader gap RG2 is maintained. The thermally conducting non-magnetic layer 225, however, is thermally conductive and thus reduces the thermal resistance between the reader 205 and the shared magnetic shield layer 204. This reduced thermal resistance allows more power to be dissipated in the reader 205 without overheating. The bias current passing through the reader 205 can therefore be higher without causing overheating. The readback amplitude is increased proportional to the bias current and a desired amplitude of readback pulses can be achieved, making the arrangement operable with areal densities that can't be practically achieved with the prior art arrangement shown in FIG. 2.

Read sensor 205 senses external magnetic field components 230 emanating from a track in the magnetic layer 226 as the track flies past the head 223 at a constant speed. The magnetic field components 230 are present over each transition 228 in the magnetic layer 226. Each transition 228 is a line or wall along which the direction of the magnetization in magnetic layer 226 reverses or changes direction. Each magnetic field component 226 is sensed as it passes between the magnetic shielding layers 203, 204. The shielding layers 203, 204 shield the read sensor 205 from neighboring external magnetic field components 230. During operation of a disc drive, the head 223 remains spaced away from the magnetic layer 226 by a spacing 232. The spacing 232 includes an air bearing protective layer and any protective layer that is deposited over the magnetic layer 226.

Digitized information is stored on the magnetic layer 226 in the form of magnetic transitions 228. Each bit is represented by the presence (1) or absence (0) of a transition in the media. When transitions 230 are sensed, external electronic circuitry connected to the read sensor 205 interprets the transition 230 as one logical state (a one (1) for example), and interprets the absence of a transition 230 at a particular time as another logical state (a zero, for example). The read sensor 205 produces readback pulses that are coupled to the external electronic circuitry. Various arrangements of the read sensor 205 and shields 203, 204 with thermally conductive nonmagnetic layers are explained in still more detail below in connection with FIGS. 5–11.

Figure 5:
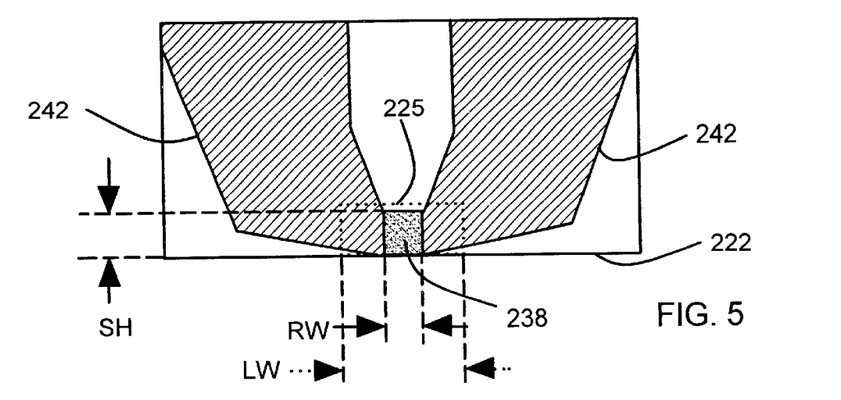
FIG. 5 illustrates an enlarged partial cross sectional front view of the read sensor in FIG. 4.

FIG. 5 illustrates a cross-sectional view of the alignment of a magnetoresistor 238 and its associated electrical contacts 242 that are part of the magnetoresistive sensor 205 shown in FIGS. 3–4. The view illustrated in FIG. 5 is normal to the air bearing surface 222. FIG. 5 illustrates a read width RW of the magnetoresistor 238 and also a stripe height SH of the magnetoresistor 238. The alignment of a thermally conducting nonmagnetic layer 225 is illustrated by a dotted line. The thermally conducting nonmagnetic layer 225 has a layer width LW that is parallel to the read width RW and that extends beyond the read width RW as illustrated.

Figure 6:
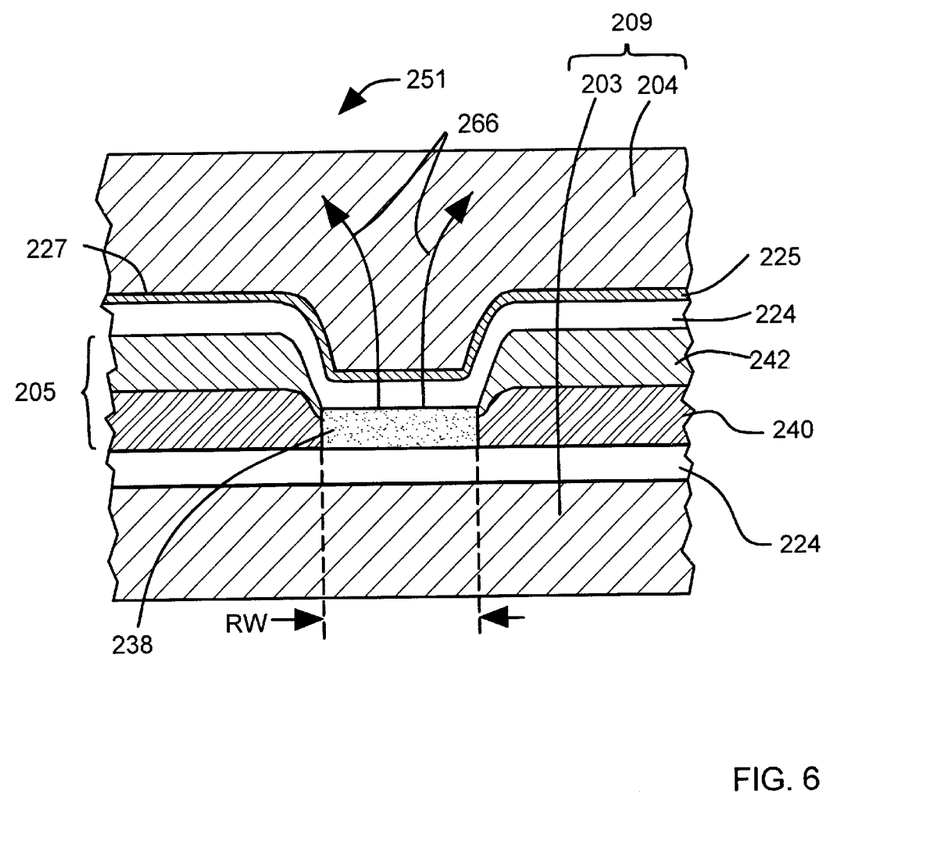
FIG. 6 illustrates an enlarged bottom view of the read sensor shown in FIGS. 4–5.

FIG. 6 illustrates an enlarged bottom view of a portion 251 of the read sensor 223 shown in FIGS. 4–5. The read sensor 223 is part of the read/write head 200 shown in FIG. 3 that includes a slider substrate 201 supporting the bottom magnetic shield layer 203 and a write head 211 disposed on a shared magnetic shield layer 204. The bottom magnetic shield layer 203 and the shared magnetic shield layer 204 are spaced apart from each other and, taken together, comprise a read shield 209.

The read sensor 205 is disposed between the bottom magnetic shield layer 203 and the shared magnetic shield layer 204. The read sensor 205 is spaced apart from the read shield 209 by reader magnetic gaps RG1 and RG2 (FIG. 4). Electrically insulating layers 224 on the read sensor provide electrical insulation between the read sensor 205 and the read shield 209, however, the electrically insulating layers 224 also form an undesired thermal resistance between the read sensor 205 and the read shield 209.

The thermally conducting nonmagnetic layer 225 is deposited on the read shield 209 in a first one RG2 of the reader magnetic gaps RG1, RG2. The thermally conducting nonmagnetic layer 225 reduces the thermal resistance without a corresponding reduction in the reader magnetic gaps RG1, RG2. As illustrated in FIG. 6 at lines 266, there is an enhanced heat flow from the magnetoresistor 238 to the shared magnetic shield layer 204 through the thermally conducting nonmagnetic layer 225.

By using the thermally conductive nonmagnetic layer 225 to replace a portion of an adjacent insulating layer 224, higher levels of bias current can be applied to the magnetoresistive sensor 205 without overheating the magnetoresistor 238. The needed level of readback amplitude is achieved without overheating.

In a preferred arrangement, the thermally conducting nonmagnetic layer 225 comprises a metal layer deposited adjacent the read shield 209. The metal layer preferably comprises tungsten or chromium, which have good corrosion properties and high smearing resistance at the lapped surface 222. In a further preferred arrangement, a thin seed layer is deposited at the interface 227 between the thermally conducting nonmagnetic layer 225 and the read shield 209. The thin seed layer is preferably a mixture of metals that match those used in the read shield 209 and the thermally conducting nonmagnetic layer 225. For example, a seed layer that is a mixture of nickel, iron and tungsten can be used as a seed layer between a tungsten layer 225 and a permalloy layer 204.

In another preferred arrangement, the electrically insulating layers 224 are atomic layer depositions (ALD) of $Al_2O_3$. As explained below in connection with FIGS. 10–11, electrical insulating layers deposited using the ALD process have improved electrical insulation breakdown reliability, allowing thinner layers 224 to be used. In one preferred arrangement, the electrically insulating layer 224 adjacent the thermally conductive nonmagnetic layer 225 has a thickness of 20 nanometers or less. In another preferred arrangement, the electrically insulating layer 224 adjacent the thermally conductive nonmagnetic layer 225 has a thickness of 10 nanometers or less. In applications where problems are encountered with voltage breakdown of a reduced insulating layer, this voltage breakdown problem can be reduced by using atomic layer deposition (ALD) material in the insulating layer.

Figure 7:
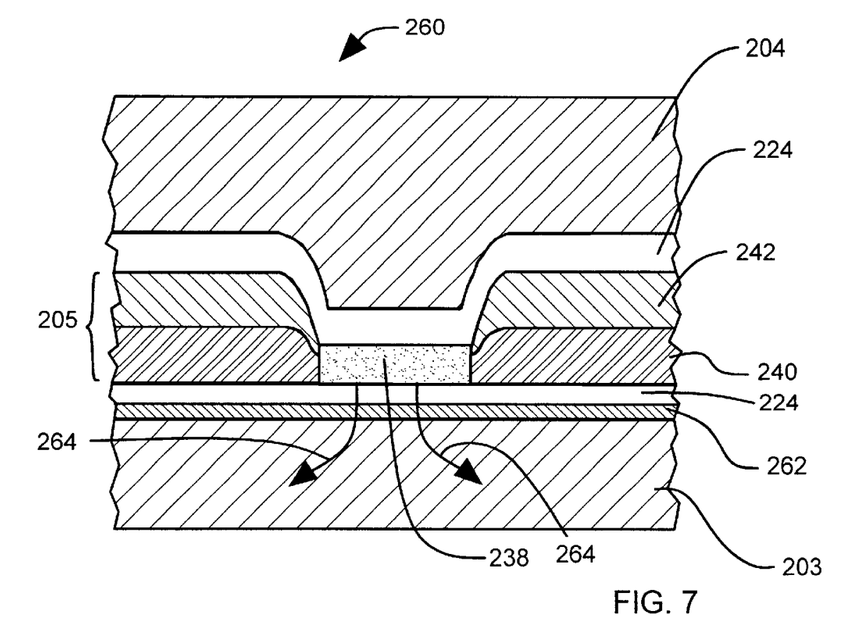
FIG. 7 illustrates an enlarged bottom view of a second embodiment of a magnetoresistive read sensor.

FIG. 7 illustrates an enlarged bottom view of a second embodiment of a magnetoresistive read sensor 260 that includes a thermally conducting nonmagnetic layer 262 in a read gap. The arrangement illustrated in FIG. 7 is similar to the arrangement illustrated in FIG. 6 except that in FIG. 7 the nonmagnetic layer 262 is deposited on the bottom magnetic shield layer 203 instead of the shared magnetic shield layer 204. As illustrated in FIG. 7 at lines 264, there is an enhanced heat flow from the magnetoresistor 238 to the bottom magnetic shield layer 203 through the thermally conducting nonmagnetic layer 262.

Figure 8:
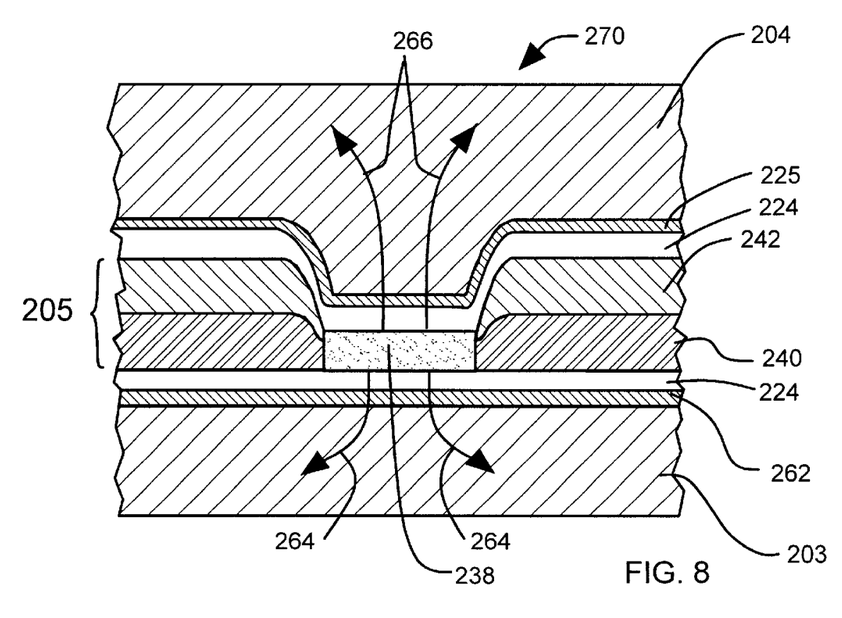
FIG. 8 illustrates an enlarged bottom view of a third embodiment of a magnetoresistive read sensor.

FIG. 8 illustrates an enlarged bottom view of a third embodiment of a magnetoresistive read sensor that includes a thermally conducting nonmagnetic layer in a read gap. The arrangement illustrated in FIG. 8 is similar to the arrangement illustrated in FIGS. 6–7 except that in FIG. 8 the nonmagnetic layer 262 is deposited on the bottom magnetic shield layer 203, and also the nonmagnetic layer 225 is deposited on the shared magnetic shield layer 204. In FIG. 8, each of the two insulating layers 224 is reduced in thickness to accommodate one of the nonmagnetic layers 225, 262. As illustrated in FIG. 8 at lines 264, 266, there is an enhanced heat flow from the magnetoresistor 238 to the bottom magnetic shield layer 203 through the first thermally conducting nonmagnetic layer 262, and there is also an enhanced heat flow form the magnetoresistor 238 to the shared magnetic shield layer 204 through the second thermally conducting nonmagnetic layer 225.

Figure 9:
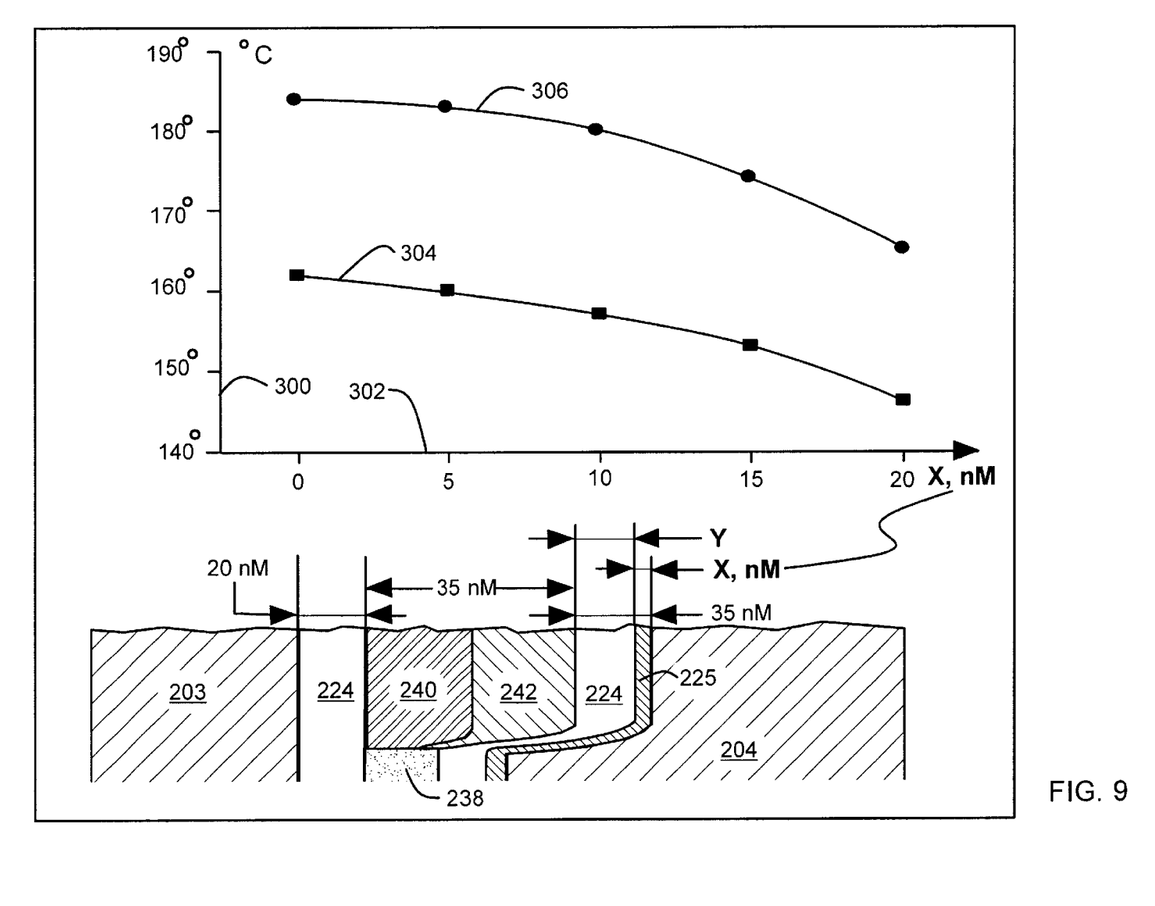
FIG. 9 illustrates peak and average temperatures in a magnetoresistor as a function of a thickness X of a thermally conducting nonmagnetic layer.

FIG. 9 illustrates a finite element analysis of peak and average temperatures in a magnetoresistor as a function of a thickness X of a thermally conducting nonmagnetic layer 225 in a head such as the one illustrated in FIG. 6.

In FIG. 9, the vertical axis 300 represents temperature in degrees centigrade and the horizontal axis 302 represents the thickness X in nanometers (nM). A first curve 304 illustrates an average calculated temperature of the magnetoresistor 238 as a function of the thickness X. A second curve 306 illustrates a peak calculated temperature of the magnetoresistor 238. The dimensions used in the finite element analysis model are illustrated at the bottom of FIG. 9. The insulating layer 224 adjacent the bottom shield 203 has a thickness of 20 nM. The read sensor 205 (including the magnetoresistor 238, the bias magnet 240 and the electrical contact 242) has a thickness of 35 nM. The magnetoresistor 238 has a reader width of 250 nM and a stripe height of 150 nM, and the bias current is 4 mA. The thermally conducting nonmagnetic layer 225 has a thickness X which is varied in the finite element analysis. The combined thickness of the thermally conducting non-magnetic layer 225 and the adjacent insulating layer 224 is 35 nM. The insulating layer 224 adjacent the non-magnetic layer has a thickness Y=(35 nM-X) that varies in the finite element analysis. It is found that the results are relatively insensitive to the thermal conductivity of the thermally conducting nonmagnetic layer 225 so long as the layer 225 has a thermal conductivity that is near the thermal conductivity of the shared magnetic shield layer 204. As can be seen from the first curve 304, the average temperature of the magnetoresistor 238 can be reduced up to about 16 degrees centigrade by increasing the thickness of layer 225 up to about 20 nM. As shown by curve 306, the peak temperature can be reduced up to about 20 degrees centigrade by increasing the thickness of layer 225 up to about 20 nM.

Figure 10:
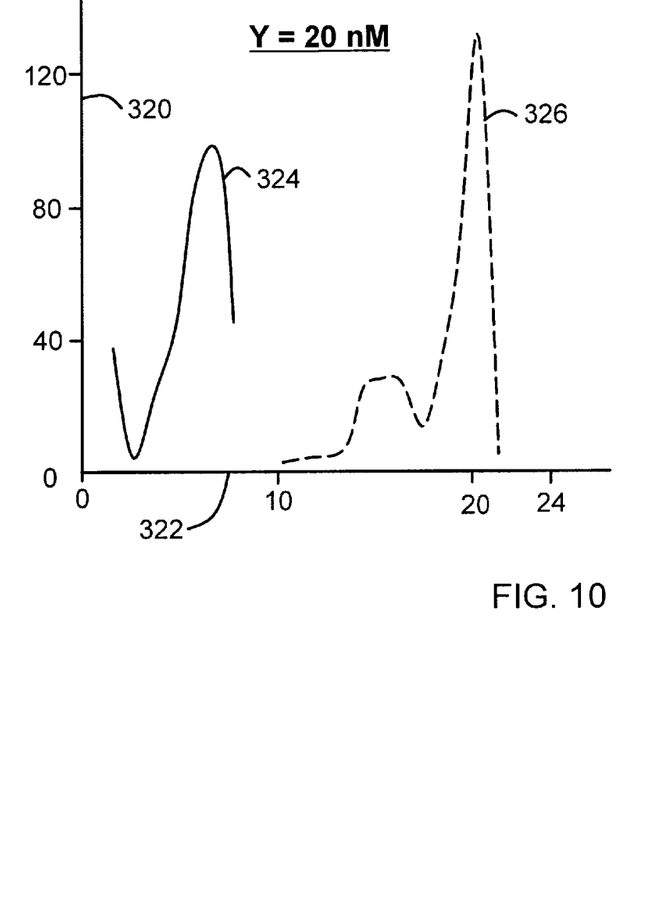
FIG. 10 illustrates electrical breakdown failure rates of Y=20 nanometers thick $Al_2O_3$ layers.

FIG. 10 illustrates electrical breakdown failure rates of Y=20 nanometers thick $Al_2O_3$ layers. FIG. 10 includes a vertical axis 320 representing a rate of insulation breakdown failures per unit time, and a horizontal axis 322 representing a voltage applied across a thickness Y=20 nM of insulation material on a curved surface simulating the shaped surfaces of insulation material 224 in the read sensors illustrated above in FIGS. 6–8. A first curve 324 illustrates a measured rate of insulation breakdown failures for a conventional reactively sputtered $Al_2O_3$ deposition process. A second curve 326 illustrates a measured rate of insulation breakdown failures for an atomic layer deposition (ALD) process for $Al_2O_3$. For a voltage difference of 7 volts across the 20 nM layer, for example, the failure rate using conventional reactive sputtering deposition is approximately 100 failures per unit time, while the failure rate using the ALD process is less than 1 per unit time. The ALD process provides very dense, conformal, low leakage current, high breakdown voltage films in the regime around 10 nM thickness. The ALD process has low pinhole density, low impurity concentration and good step coverage, and can be used without a presputter etch.

Figure 11:
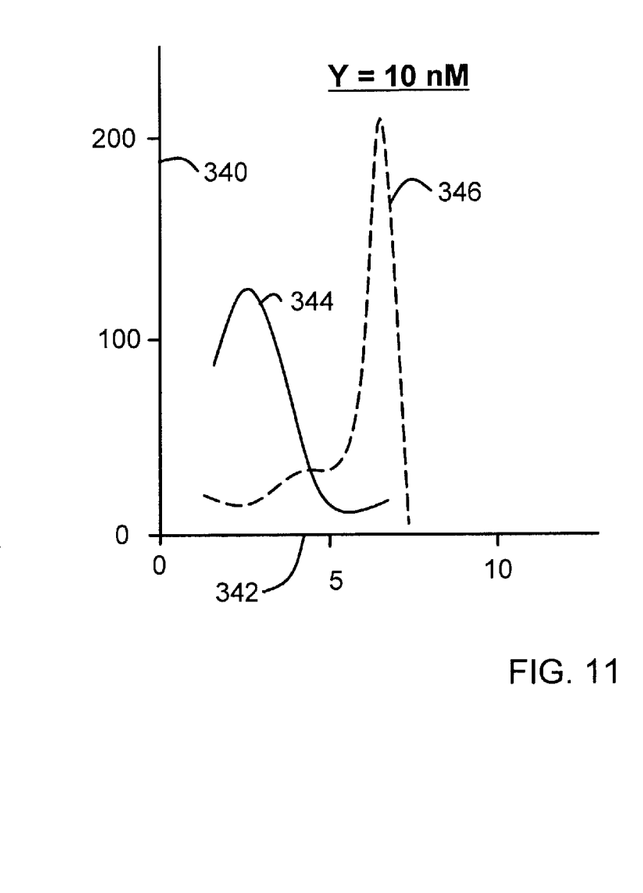
FIG. 11 illustrates electrical breakdown failure rates of Y=10 nanometers thick $Al_2O_3$ layers.

FIG. 11 illustrates electrical breakdown failure rates of Y=10 nanometers thick $Al_2O_3$ layers. FIG. 11 includes a vertical axis 340 representing a rate of insulation breakdown failures per unit time, and a horizontal axis 342 representing a voltage applied across a thickness Y=10 nM of insulation material on a curved surface simulating the shaped surfaces of insulation material 224 in the read sensors illustrated above in FIGS. 6–8. A first curve 344 illustrates a measured rate of insulation breakdown failures for a conventional reactive sputtering $Al_2O_3$ deposition process. A second curve 346 illustrates a measured rate of insulation breakdown failures for an atomic layer deposition (ALD) process for $Al_2O_3$. For a voltage difference of 2 volts across the 10 nM layer, for example, the failure rate using conventional reactive sputtering deposition is approximately 130 failures per unit time, while the failure rate using the ALD process is less than 10 per unit time.

In summary, a read/write head (110, 200) comprises a slider substrate (201) and a read shield (209). The read shield includes a bottom magnetic shield layer (203) on the slider substrate and a shared magnetic shield layer (204) that is spaced apart from the bottom magnetic shield layer.

The read/write head comprises a write head (211) disposed on the shared magnetic shield layer. The read/write head also comprises a read sensor (223) disposed between the bottom magnetic shield layer and the shared magnetic shield layer. The read sensor is spaced apart from the read shield by reader magnetic gaps (RG1, RG2).

The read/write head also comprises electrically insulating layers (224) on the read sensor. The electrically insulating layers form a thermal resistance between the read sensor and the read shield.

The read/write head also comprises a thermally conducting nonmagnetic layer (225, 262) deposited on the read shield in a first one of the reader magnetic gaps. The thermally conducting nonmagnetic layer reduces the thermal resistance without a corresponding reduction in the reader magnetic gaps.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write while maintaining substantially the same functionality without departing from the scope and spirit of the present invention. For example, additional layers to improve performance can be included and the shapes of features in the read/write head can vary depending on the needs of the application. In addition, although the preferred embodiment described herein is directed to a thin film head for a hard disc drive system, it will be appreciated by those skilled in the art that the teachings of the present invention can be applied to other magnetic systems, like tape drives, without departing from the scope and spirit of the present invention.

What is claimed is:

1. A read/write head comprising:
   a slider substrate;
   a read shield including a bottom magnetic shield layer on the slider substrate and a shared magnetic shield layer that is spaced apart from the bottom magnetic shield layer;
   a write head disposed on the shared magnetic shield layer;
   a read sensor disposed between the bottom magnetic shield layer and the shared magnetic shield layer, the read sensor being spaced apart from the read shield by reader magnetic gaps;
   electrically insulating layers on the read sensor, the electrically insulating layers forming thermal resistance between the read sensor and the read shield;
   a thermally conducting nonmagnetic metal layer comprising a metal selected from the group of tungsten and chromium, the metal layer being deposited on the read shield in a first one of the reader magnetic gaps, the thermally conducting nonmagnetic layer reducing the thermal resistance without a corresponding reduction in the reader magnetic gaps; and
   a seed layer bonding the metal layer to the read shield, wherein the seed layer is a mixture of metals including metal matching metal used in the read shield and metal matching metal used in the metal layer.

2. The read/write head of claim 1 wherein the electrically insulating layers are layers of atomic layer deposition of $Al_2O_3$.

3. The read/write head of claim 2 wherein the electrically insulating layers include a layer that has a thickness of 20 nanometers or less.

4. The read/write head of claim 3 wherein the electrically insulating layer includes a layer that has a thickness of 10 nanometers or less.

5. A method of manufacturing a read/write head, comprising:
   providing a slider substrate;
   depositing a bottom magnetic shield layer on the slider substrate and depositing a shared magnetic shield layer that is spaced apart from the bottom magnetic shield layer, the bottom magnetic shield layer and the shared magnetic shield layer forming a read shield;
   depositing a write head on the shared magnetic shield layer;
   depositing a read sensor between the bottom magnetic shield layer and the shared magnetic shield layer and spacing the read sensor apart from the read shield by reader magnetic gaps;
   depositing electrically insulating layers on the read sensor, the electrically insulating layers forming thermal resistance between the read sensor and the read shield;
   depositing a seed layer on the read shield, the seed layer being formed from a mixture of metals including metal matching metal used in the read shield and metal matching metal used in thermally conductive nonmagnetic metal layer; and
   reducing the thermal resistance without a corresponding reduction in the reader magnetic gaps by depositing the thermally conducting nonmagnetic metal layer on the read shield in a first one of the reader magnetic gaps.

6. The method of claim 5, further comprising:
   forming the electrically insulating layers by a process of atomic layer deposition of $Al_2O_3$.

7. The method of claim 6, further comprising:
   forming at least one of the electrically insulating layers with a thickness of 20 nanometers or less.

8. The method of claim 7, further comprising:
   forming at least one of the electrically insulating layers with a thickness of 10 nanometers or less.

9. A read/write head comprising:
   a bottom magnetic shield layer on a slider substrate and a shared magnetic shield layer that is spaced apart from the bottom magnetic shield layer, a write head disposed on the shared magnetic shield layer, a read sensor that has read width and that is spaced apart from the read shield by reader magnetic gaps, electrically insulating layers on the read sensor forming thermal resistance between the read sensor and the bottom and shared magnetic shield layers;
   means for reducing the thermal resistance without a corresponding reduction in the reader magnetic gaps, the means having a layer width that is parallel to the read width and extends beyond the read width; and
   means for forming a seed layer for bonding means for reducing the thermal resistance to the shield layer from a mixture of metals including metal matching metal used in the read shield and metal matching metal used in the means for reducing thermal resistance.

* * * * *